Nov. 13, 1962  P. M. ABDELMASEH  3,063,187
LIVE BAIT CASTING DEVICE
Filed Dec. 10, 1959
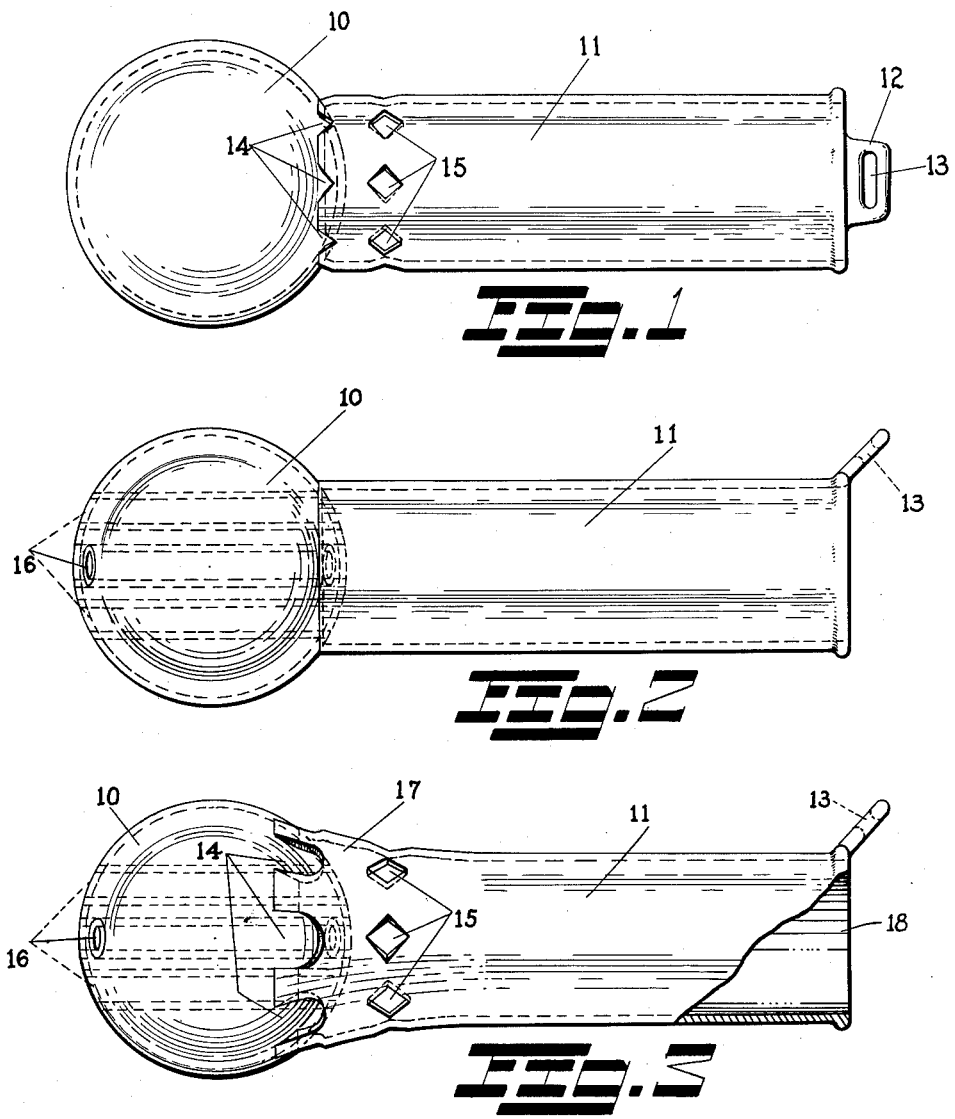
INVENTOR.
PETER M. ABDELMASEH
BY Albert G. Mahassel
ATTORNEY

United States Patent Office 3,063,187
Patented Nov. 13, 1962

3,063,187
LIVE BAIT CASTING DEVICE
Peter M. Abdelmaseh, 125 Francis St., Worcester, Mass.
Filed Dec. 10, 1959, Ser. No. 858,707
1 Claim. (Cl. 43—41.2)

This invention relates to a device for use in fishing and, particularly, to a combination protection unit and bobber for live bait casting.

It is the general object of the invention to provide a protection device effective to eliminate shock or injury to live bait due to impact with water or even complete loss thereof when casting, which device at the completion of its protective function then serves as a bobber and which is especially designed to minimize water resistance thereupon during the retrieving operation.

More specifically it is an object to provide a live bait casting device which comprises a float member, a tubular chamber one end of which is attached to said float member and open at the opposite end, and means permitting relatively unobstructed flow of water through the tubular chamber when retrieving, thereby to minimize water resistance upon the device at such times.

United States Patent Number 2,629,198 discloses a live bait saving bobber which comprises a float and a hollow chamber secured at one end to said float and open at the opposite end, latch means being provided for said open end. Such a device is effective to prevent loss or destruction of live bait by casting but due to the fact that it must be retrieved with the open end of the chamber leading, substantial water resistance is imparted to the unit.

According to the present invention, openings are provided in the sides of the tubular chamber or through the float member or both such that the aggregate size of the openings is sufficient to permit substantially unobstructed flow of water through the unit.

Further objects and advantages will be apparent from the description to follow.

In the drawings:

FIG. 1 is a plan view of the protection device wherein the openings are provided in the tubular member adjacent the end thereof which is attached to the float; FIG. 2 is a plan view of a modified form of the device wherein tubular openings are provided in the float member; and FIG. 3 is a plan view, partly in section, of another modification which is provided with both types of openings.

In the form of the invention illustrated in FIG. 1 a float member 10 is attached to one end of a tubular chamber 11. The float is preferably spherical in shape, although not necessarily so. Both the float and chamber may be formed of a plastic material such as polyethylene and have wall thickness which will impart the optimum weight to the device to permit casting for varied distances. The open end of the tubular chamber is provided with an extension 12 having an eyelet 13 therein for reception of the main leader and fish lines (not shown). The closed end of the tubular chamber has a plurality of spaced openings 14 circumferentially disposed at the juncture thereof with the float member and further openings 15 also circumferentially disposed and slightly spaced from the first mentioned openings. In order to minimize water resistance upon the unit during retrieving, the aggregate area of the openings 14 and 15 should at least equal the area of the opening 18 at the opposite end of the tubular chamber. However, it is apparent that even where the aggregate area of the openings is less than such an amount, water resistance will be lessened proportionately smaller amounts. In order to prevent interference with the fishing hook (not shown) which is to be inserted together with live bait such as a minnow into the tubular chamber, the openings in that chamber should be confined as much as possible to the restricted end thereof.

In the modification illustrated in FIG. 2 the float member is provided with a plurality of tubular openings 16 which extend completely through the float and communicate with the tubular chamber. This type of structure minimizes water turbulence since there is no lateral deflection from the normal flow path.

A preferred form of the invention is shown in FIG. 3 which is provided with the two types of openings of FIGS. 1 and 2. Additionally the restricted end of the tubular chamber is tapered outwardly as shown at 17 in order to permit a maximum number of circumferentially spaced openings in the tubular chamber within a limited length thereof.

The hollow tube should be large enough to hold a shiner or minnow having a hook pierced therethrough. A leader line is connected from the hook to the eyelet and the reel line is also attached to the same eyelet. When the baited unit is cast by the fisherman, the float will lead and strike the water and the tubular chamber will then assume a vertical position with the open end lowermost thereby permitting the live bait to fall out uninjured and securely attached to the hook. Further, this casting device makes possible repeated use of the same bait. Retrieving is made easier whether or not a catch has been made due to the substantial decrease in water resistance made possible by flow through of water.

While several preferred embodiments of the invention have been illustrated and described, it is apparent that still further apparent modifications may be devised without departing from the spirit or scope of the invention.

I claim:

A live bait casting device which comprises a float member, a generally enclosed tubular chamber integral with and attached at one end to said float member and having an opening at the other end thereof, said chamber being tapered outwardly toward said float member only at said one end, there being a plurality of tubular passageways extending through said float member and communicating with said chamber, there being a plurality of cutout portions circumferentially spaced about said tubular chamber and located only in the tapered portion of said tubular chamber, the total area of said passageways and cutout portions being at least substantially equal to the area of said opening, and an externally located, outwardly flared extension adjacent said opening and having an eyelet therein for the attachment of both leader and fish lines thereto.

References Cited in the file of this patent

UNITED STATES PATENTS

| | | |
|---|---|---|
| 1,128,205 | White | Feb. 9, 1915 |
| 2,027,069 | Sorenson | Jan. 7, 1936 |
| 2,261,549 | Hayes | Nov. 4, 1941 |
| 2,629,198 | Johnston | Feb. 24, 1953 |
| 2,659,995 | Hagstrom | Nov. 24, 1953 |
| 2,718,086 | Miner | Sept. 20, 1955 |
| 2,768,464 | Volz | Oct. 30, 1956 |
| 2,794,288 | Marshall | June 4, 1957 |
| 2,910,798 | Bias | Nov. 3, 1959 |

FOREIGN PATENTS

| | | |
|---|---|---|
| 512,640 | Canada | May 10, 1955 |
| 142,142 | Sweden | Sept. 15, 1953 |